(12) United States Patent
Way

(10) Patent No.: US 7,577,366 B2
(45) Date of Patent: Aug. 18, 2009

(54) SELECTABLE DISPERSION ENHANCEMENT

(75) Inventor: David G. Way, Garland, TX (US)

(73) Assignee: Fujitsu Limited, Kanagawa (JP)

( * ) Notice: Subject to any disclaimer, the term of this patent is extended or adjusted under 35 U.S.C. 154(b) by 1257 days.

(21) Appl. No.: 10/041,853

(22) Filed: Jan. 7, 2002

(65) Prior Publication Data

US 2003/0128920 A1 Jul. 10, 2003

(51) Int. Cl.
*H04B 10/12* (2006.01)
*H04B 10/08* (2006.01)

(52) U.S. Cl. .......................... 398/148; 398/29; 398/159

(58) Field of Classification Search .................. 398/29, 398/147, 148, 149, 158, 159, 208; 385/100; 359/161
See application file for complete search history.

(56) References Cited

U.S. PATENT DOCUMENTS

| | | | | |
|---|---|---|---|---|
| 5,430,822 A | 7/1995 | Shigematsu et al. | ......... | 385/123 |
| 5,539,563 A | 7/1996 | Park | ........................... | 359/161 |
| 5,608,562 A * | 3/1997 | Delavaux et al. | ............ | 398/148 |
| 5,677,780 A | 10/1997 | Nuyts | ......................... | 359/161 |
| 5,680,491 A | 10/1997 | Shigematsu et al. | ........... | 385/24 |
| 5,781,673 A | 7/1998 | Reed et al. | ..................... | 385/24 |
| 5,877,881 A | 3/1999 | Miyauchi et al. | ............ | 359/161 |
| 5,886,804 A | 3/1999 | Onaka et al. | ................ | 359/161 |
| 5,887,093 A | 3/1999 | Hansen et al. | ................ | 385/27 |
| 6,137,604 A | 10/2000 | Bergano | ..................... | 359/124 |
| 6,157,477 A | 12/2000 | Robinson | .................... | 359/161 |
| 6,178,279 B1 | 1/2001 | Mukasa et al. | .............. | 385/123 |
| 6,181,852 B1 | 1/2001 | Adams et al. | ................. | 385/37 |
| 6,236,495 B1 | 5/2001 | Moeller | ....................... | 359/337 |
| 6,259,845 B1 | 7/2001 | Sardesai | ..................... | 385/123 |
| 6,262,828 B1 | 7/2001 | Akiyama et al. | ............ | 359/237 |
| 6,263,138 B1 | 7/2001 | Sillard et al. | ................ | 385/123 |
| 6,266,170 B1 | 7/2001 | Fee | .............................. | 359/161 |
| 6,266,457 B1 | 7/2001 | Jacob | ........................... | 385/11 |
| 6,288,810 B1 | 9/2001 | Grasso et al. | ................ | 359/127 |
| 6,292,603 B1 | 9/2001 | Mizuochi et al. | ............. | 385/24 |
| 6,456,773 B1 * | 9/2002 | Keys | ........................... | 385/135 |
| 6,654,564 B1 * | 11/2003 | Colbourne et al. | .......... | 398/147 |
| 2002/0003646 A1 * | 1/2002 | Ishikawa | ..................... | 359/161 |
| 2003/0031433 A1 * | 2/2003 | Feinberg | ..................... | 385/100 |

* cited by examiner

*Primary Examiner*—Nathan M Curs
(74) *Attorney, Agent, or Firm*—Baker Botts L.L.P.

(57) ABSTRACT

A dispersion compensation system includes a dispersion compensation module and a dispersion enhancement module. The dispersion compensation module receives optical input and provides optical output having a negative dispersion relative to the optical input. The dispersion enhancement module receives optical signals from a transport fiber and may increase positive dispersion in the optical signals by a configured amount such that the positive dispersion provided by the transport fiber and the dispersion enhancement module substantially equals the magnitude of the negative dispersion provided by the dispersion compensation module.

17 Claims, 2 Drawing Sheets

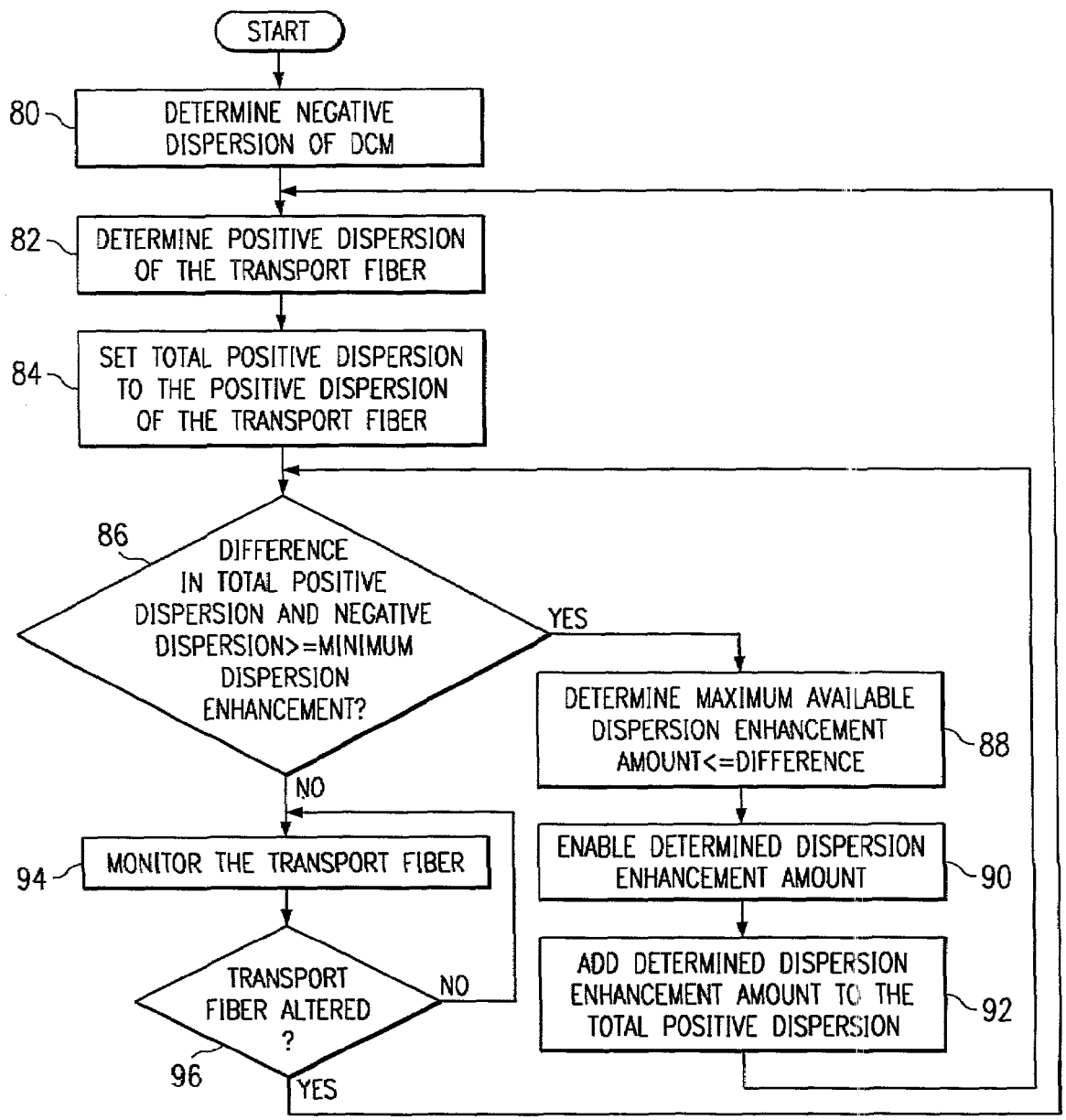

SELECTABLE DISPERSION ENHANCEMENT

TECHNICAL FIELD OF THE INVENTION

The present invention relates generally to optical communication networks and, more particularly, to selectable dispersion enhancement.

BACKGROUND OF THE INVENTION

In optical communication systems, fibers transport information in the form of optical signals. As optical signals propagate along a fiber, various interferences and distortions can affect the quality of received information. One distortion that affects optical signals is chromatic dispersion. To account for dispersion, many optical network elements are configured to include dispersion compensation equipment. To compensate for dispersion in a transport fiber, a dispersion compensator may include a length of dispersion compensation fiber providing the inverse dispersion of the transport fiber. Thus, positive dispersion within the transport fiber is counteracted by negative dispersion within the dispersion compensation fiber. Due to the varying lengths of transport fiber used in optical communication networks, dispersion compensation equipment requires similar variations in lengths of dispersion compensation fiber. This can complicate installation and maintenance of optical communication equipment and potentially degrade network performance.

SUMMARY OF THE INVENTION

In accordance with the present invention, techniques for selectable dispersion enhancement are provided which substantially eliminate or reduce disadvantages and problems associated with previous techniques.

A dispersion compensation system includes a dispersion compensation module that receives optical input and provides optical output having a negative dispersion relative to the optical input. The system further includes a dispersion enhancement module adapted for optical coupling between the dispersion compensation module and an optical fiber having a positive dispersion. The dispersion enhancement module selectively increases the positive dispersion provided by the optical fiber by any of a plurality of amounts and provides the optical input to the dispersion compensation module, with the optical input having a positive dispersion substantially equal to the positive dispersion of the optical fiber plus a selected one of the amounts of dispersion in the dispersion enhancement module.

Embodiments of the invention provide various technical advantages. Using a selectable dispersion enhancement module can simplify installation. Technicians need not carry multiple lengths of dispersion compensation fiber, rather, they may use a single dispersion compensation module having amplifiers and a standard length of dispersion compensation fiber that may be packaged as a single unit. The dispersion compensation module further includes or is accompanied by a dispersion enhancement module. The technician may configure the dispersion enhancement module to increase dispersion in received optical signals to the amount expected in the dispersion compensation module. Thus, a fixed negative dispersion in the dispersion compensation fiber is accommodated using the dispersion enhancement module to match total positive dispersion to the negative dispersion.

Dispersion enhancement modules may additionally support automatic configuration. For example, a dispersion enhancement module may detect the amount of dispersion within a transport fiber and automatically select an amount of dispersion enhancement to provide an expected amount of dispersion to a dispersion compensation unit. This feature further supports rapid response to changes in line conditions. For example, in response to a disruption on a primary transport fiber, an optical network may switch to a backup fiber. A dispersion enhancement module may detect the change in conditions and adjust the amount of dispersion enhancement appropriately.

Using a dispersion enhancement module further provides favorable insertion performance characteristics. Because power budgets become increasingly strained as fiber lengths and the number of fibers within a communication path increase, it is desirable to minimize power loss in circumstances pushing the limit of a power budget. With the dispersion enhancement module within a system, administrators may design a power budget that accounts for a maximum length of transport fiber and a corresponding length of dispersion compensation fiber. For lengths of transport fiber less than this maximum, the dispersion enhancement module provides varying levels of dispersion enhancement, with higher levels of dispersion enhancement provided as the length of the transport fiber becomes lower. Thus, power losses related to the use of a dispersion enhancement module increase is the length of a transport fiber decreases. However, the amount of excess power when using smaller lengths of transport fiber more than makes up for the insertion losses resulting from the use of a dispersion enhancement module. Therefore, the power losses caused by use of a dispersion enhancement module occur in circumstances where they are tolerable.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 4 is a flowchart illustrating a method for using selectable dispersion enhancement within a dispersion compensation system.

DETAILED DESCRIPTION OF THE INVENTION

Figure 1:
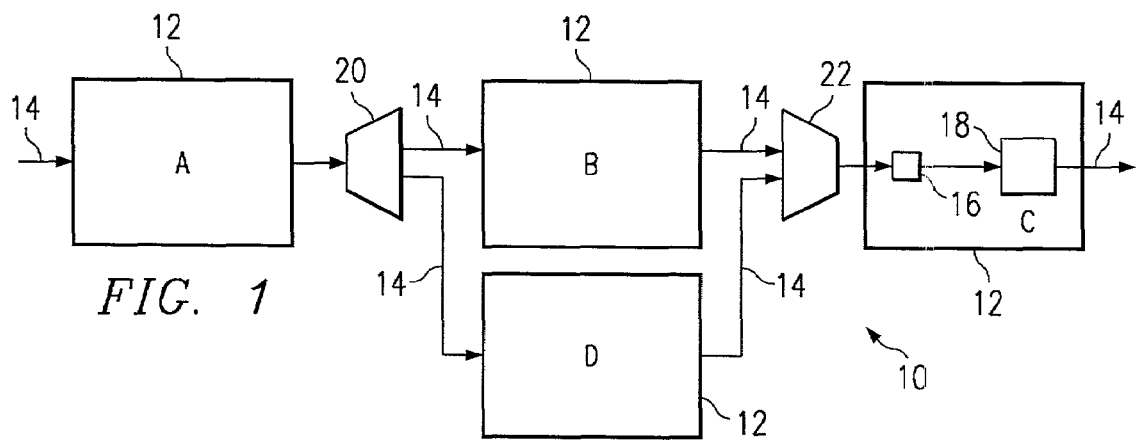
FIG. 1 illustrates a portion of an optical communication system having a dispersion compensation system in accordance with various embodiments of the present invention.

FIG. 1 illustrates a portion of an optical communication system, indicated generally at 10, that includes optical network nodes 12 interlinked using optical fibers 14. In general, node 12 provides varying levels of dispersion enhancement to enable effective compensation for dispersion in received optical signals. More specifically, node 12 may include a dispersion enhancement module (DEM) 16 for enhancing dispersion of signals received on fiber 14 to a level compensated for by a dispersion compensation module (DCM) 18.

In the embodiment illustrated, four nodes 12 labeled A, B, C, and D (node A, node B, node C, and node D) are interlinked by fibers 14. These links form two paths between node A and node C, a first path through node B and a second path through node D. To support routing of communications over the two paths, system 10 includes a one by two optical switch 20 and a two by one optical switch 22. Switches 20 and 22 may provide, for example, failover to a backup route given a disruption on one or more fibers 14.

Nodes 12 represent any suitable equipment, including accompanying logic, for supporting optical communications. For example, nodes 12 may represent add/drop multiplexers, repeaters, amplifiers, or other appropriate optical communication equipment. In the embodiment illustrated, node C includes dispersion enhancement module 16 and dispersion compensation module 18, which work together to cancel dispersion in received optical signals. Dispersion enhancement module 16 provides varying amounts of dispersion enhancement to received optical signals. Thus, in response to automatic and/or manual configurations, dispersion enhancement module 16 may effect a set amount of dispersion on received optical signals. Dispersion compensation module 18 provides a fixed amount of dispersion compensation for received optical signals. Therefore, while dispersion enhancement module 16 provides varying amounts of positive dispersion, dispersion compensation module 18 provides a fixed amount of negative dispersion.

Fibers 14 link nodes 12 and support communications by transporting optical signals. Each fiber 14 may be formed of varying types of materials that affect the transport characteristics as light flows along fiber 14. According to particular embodiments, fibers 14 are non-zero dispersion shifted fibers and/or non-dispersion shifted fibers. Thus, as optical signals travel along fibers 14, they will be affected by dispersion. For example, along non-zero dispersion shifted fibers, optical signals will typically disperse at a rate of two to eleven ps/nm/km (the "dispersion value" of non-zero dispersion shifted fiber). In non-dispersion shifted fiber, the dispersion value is typically in the range of seventeen ps/nm/km. However, while the preceding examples provide specific ranges for dispersion values, system 10 contemplates using and compensation for transport media having any suitable ranges of dispersion values.

In operation, node C receives optical signals from switch 22 which selects the signals from either node B or node C. To compensate for dispersion in received optical signals, dispersion enhancement module 16 may increase the dispersion by a selected amount, while dispersion compensation module 18 reduces the dispersion by a set amount.

For example, assume fiber 14 between node B and node C is the active link. To provide effective dispersion compensation in node C, dispersion enhancement module 16 increases dispersion in optical signals received from node B to the amount "expected" in dispersion compensation module 18. For example, consider dispersion compensation module 18 designed to compensate for dispersion caused by one hundred fifty kilometers of the type of optical fiber forming fiber 14, with fiber 14 having a length of only one hundred kilometers. Without dispersion enhancement module 16, dispersion compensation module 18 would overcompensate for the dispersion in fiber 14, which can disrupt signals as severely as having little or no compensation. However, through appropriate selections, dispersion enhancement module 16 may be configured to increase the dispersion of optical signals received from fiber 14 such that they have dispersion as if affected by one hundred fifty kilometers of fiber 14. Thus, in this example, dispersion enhancement module 16 should provide an increase in dispersion equal to the amount of dispersion resulting from fifty kilometers of fiber 14.

Dispersion enhancement module 16 further supports changing conditions of optical links transporting information to node C. For example, given a disruption on the link between node B and node C, node A may switch over and begin communicating with node C via node D. If the characteristics of fiber 14 between node D and node C differ from those of fiber 14 between node D and node C, the dispersion enhancement module 16 may require different settings to ensure appropriate dispersion compensation within node C. To determine and switch to these new settings, dispersion enhancement module 16 may automatically detect changed conditions or may respond to appropriate configurations from administrators and/or other equipment. For example, dispersion enhancement module 16 may monitor links to determine if and how much dispersion enhancement is sufficient and automatically configure to provide the selected amount of dispersion enhancement. Similarly, administrators and/or controlling equipment may determine appropriate amounts of dispersion enhancement and configure dispersion enhancement module 16.

Figure 2:
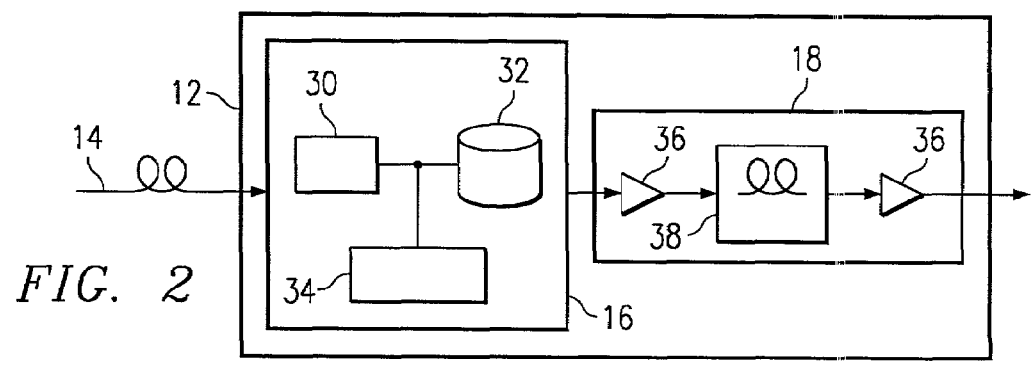
FIG. 2 is a block diagram illustrating exemplary functional components for a particular embodiment of the dispersion compensation system.

FIG. 2 is a block diagram illustrating exemplary functional components of a particular embodiment of node 12 that includes dispersion enhancement module 16 and dispersion compensation module 18. In the embodiment illustrated, dispersion enhancement module 16 includes a controller 30, a memory 32, and selectable enhancement module 34. Dispersion compensation module 18 includes optical amplifiers 36 and dispersion compensation fiber 38. In general, node 12 attempts to neutralize dispersion in received optical signals using dispersion enhancement module 16 and dispersion compensation module 18. More specifically, node 12 may increase dispersion of optical signals received on fiber 14 such that dispersion compensation module 18 negates substantially all dispersion caused by fiber 14 and dispersion enhancement module 16 without overcompensating.

Dispersion enhancement module 16 represents any suitable hardware, including associated logic, for increasing dispersion of optical signals by selected amounts. In the embodiment illustrated, dispersion enhancement module 16 includes controller 30, memory 32, and selectable enhancement module 31. Controller 30 controls the amount of dispersion provided by dispersion enhancement module 16 by selecting an appropriate amount of dispersion enhancement within selectable enhancement module 34. For example, controller 30 may respond to configurations and/or commands received from an administrator, or controller 30 may automatically determine and set appropriate amounts of dispersion enhancement. Moreover, controller 30 may monitor link conditions to automatically respond to changes in the amount of dispersion within received optical signals. For example, controller 30 may detect a switch from a first transport fiber to a second transport fiber having a different amount of optical dispersion and, in response, change the amount of dispersion enhancement provided within selectable enhancement nodule 34. To aid controller 30 in setting appropriate amounts of dispersion enhancement, dispersion enhancement module 16 may include memory 32. According to particular embodiments, memory 32 maintains information for use in selecting appropriate amounts of dispersion, such as information on positive and negative dispersion provided by other elements of system 10. For example, memory 32 may be a register storing a value indicating the amount of negative dispersion provided by dispersion compensation module 18.

Selectable enhancement module 34 enables dispersion enhancement module 16 to provide varying levels of dispersion enhancement. Selectable enhancement module 34 receives an optical signal from fiber 14 and generates an optical output having enhanced dispersion relative to the optical input, with the amount of enhancement adjustable. After receiving appropriate configurations, selectable enhancement module 34 provides a selected amount of dispersion enhancement to received optical signals. Thus, selectable enhancement module 34 can increase the amount of positive dispersion in optical signals received from fiber 14. According to particular embodiments, selectable enhancement module 34 includes multiple dispersion enhancement fibers each having a different length. Selectable enhancement module 34 couples one or more of these dispersion enhancement fibers to provide varying amounts of positive dispersion. A particular embodiment of selectable enhancement module 34 is discussed below with respect to FIG. 3.

To compensate for the dispersion caused by fiber 14 and dispersion enhancement module 16, node 12 includes dispersion compensation module 18. Dispersion compensation module 18 represents any suitable hardware, including appropriate logic, for negating dispersion in optical signals. In the embodiment illustrated, dispersion compensation module 18 includes optical amplifiers 36 and dispersion compensation fiber 38. Optical amplifiers 36 provide for amplification of optical signals. In many optical systems, optical amplifiers 36 are tuned according to operating parameters of node 12 to provide reliable quality signals. Dispersion compensation fiber 38 provides negative dispersion relative to fiber 14 and dispersion enhancement module 16 on received optical signals. Thus, upon receiving an optical input signal, dispersion compensation fiber 38 generates an optical output signal having a negative dispersion with respect to the optical input. According to particular embodiments, dispersion compensation fiber 38 is formed of material having a relatively high negative dispersion value with respect to the dispersion value of fiber 14. For example, dispersion compensation fiber 38 may have a dispersion value of negative one hundred ps/nm/km, thus requiring a significantly smaller length of dispersion compensation fiber 38 to compensation for dispersion caused by fiber 14.

During operation, dispersion enhancement module 16 is configured according to the characteristics of fiber 14 such that the positive dispersion caused by fiber 14 and dispersion enhancement module 16 substantially equals the negative dispersion provided by dispersion compensation module 18. However, while the embodiment illustrated and the preceding description focus on a particular embodiment of node 12 that includes specific elements, system contemplates nodes 12 having any suitable combination and arrangement of elements for selectively increasing dispersion of received optical signals to an amount expected by a dispersion compensation unit.

Figure 3:
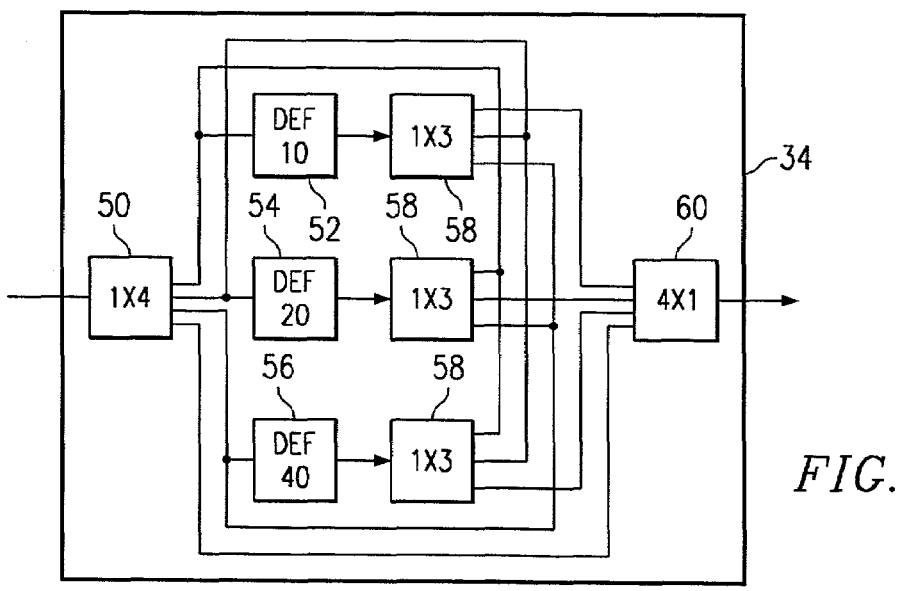
FIG. 3 is a block diagram illustrating exemplary functional components of a particular embodiment of a selectable enhancement module from the dispersion compensation system.

FIG. 3 is a block diagram illustrating exemplary components of selectable enhancement module 34. In the embodiment illustrated, selectable enhancement module 34 includes a one by four switch 50, dispersion enhancement fibers 52, 54, 56, one by three switches 58, and a four by one switch 60. Through appropriate settings of switches 50, 58, and 60, selectable enhancement module 34 routes optical signals through selected paths to provide varying amounts of dispersion enhancement. More specifically, in the embodiment illustrated, selectable enhancement module 34 may be configured to route optical signals through none or through one or more of dispersion enhancement fibers 52, 54, and 56.

Switches 50, 58, and 60 each represent equipment for routing optical signals along selected paths. Switch 50 receives an input optical signal and selects whether to route the input optical signal to one of dispersion enhancement fibers 52, 54, 56 or whether to bypass these fibers and route the received optical input signal directly to switch 60. Switches 58 control whether optical signals should route to switch 60 or if optical signals should loop back to pass through an additional one of dispersion enhancement fibers 52, 54, 56. Switch 60 selects the appropriate one of the other switches within selectable enhancement module 34 from which to receive an output optical signal. Thus, switches 50, 58, 60 provide for routing of optical signals through some, none, or all of dispersion enhancement fibers 52, 54, 56.

Dispersion enhancement fibers 52, 54, 56 provide different amounts of positive dispersion to received optical signals. In the embodiment illustrated, dispersion enhancement fibers 52, 54, 56 are formed of different lengths of fiber that disperses optical signals in the same direction as fiber 14. Moreover, as shown by the exemplary values in the illustration, dispersion enhancement fiber 52 provides similar dispersion to ten kilometers of fiber 14, dispersion enhancement fiber 54 provides similar dispersion to twenty kilometers of fiber 14, and dispersion enhancement fiber 56 provides similar dispersion to forty kilometers of fiber 14. However, as with dispersion compensation fiber 38 within dispersion compensation module 18, dispersion enhancement fibers 52, 54, 56 may be formed of materials having greater dispersion values than the materials forming fibers 14. For example, dispersion enhancement fibers 52, 54, 56 may be formed of materials having a dispersion value of one hundred ps/nm/km. This permits smaller lengths of dispersion enhancement fiber to be used while still providing appropriate levels of dispersion enhancement.

In operation, the switches within selectable enhancement module 34 are configured to provide appropriate amounts of dispersion enhancement by passing optical signals through some, none, or all of dispersion enhancement fibers 52, 54, 56. This permits selectable enhancement module 34 to provide enhancement of dispersion in received optical signals, with the selected amount of dispersion equal to an amount resulting from the optical signal passing through various lengths of fiber 14. Given the exemplary values shown in this illustration, selectable enhancement module 34 may provide dispersion enhancement from the equivalent of zero kilometers up to seventy kilometers of fiber 14, in steps of ten kilometers. For example, to provide dispersion enhancement equivalent to fifty kilometers, the switches may be configured to pass an optical signal through dispersion enhancement fiber 56 and dispersion enhancement fiber 52.

As elements are introduced into an optical path, signal power generally degrades. Thus, the various switches and fibers introduced by selectable enhancement module 34 into a signal path can reduce the power of received signals. These insertion losses increase as the number of elements within selectable enhancement module 34 that are introduced into the optical path increased. However, the design of selectable enhancement module 34 minimizes insertion losses in circumstances where those losses are less tolerable.

As previously discussed, the amount of excess power in a power budget typically increases as the distance that an optical signal travels decreases. For example, there will typically be more excess power available given a transport fiber length of fifty kilometers in comparison to a transport fiber having a length of one hundred kilometers. When using selectable enhancement module 34 to compensate for a "lack" of dispersion in received optical signals, the number of introduced elements increases as the length of the transport fiber decreases. For example, if dispersion compensation module 18 expects dispersion equivalent to one hundred kilometers of transport fiber, and the transport fiber has a length of one hundred kilometers, then selectable enhancement module 34 routes the optical signal through without passing through any of dispersion enhancement fibers 52, 54, 56. Therefore, in the extreme case where the transport fiber is at or near the maximum length accounted for in a power budget, dispersion enhancement module 16 causes little or no insertion loss.

Now consider a transport fiber having a fifty kilometer length given an expected length of one hundred kilometers. In this instance, selectable enhancement module 34 passes the received optical signal through dispersion enhancement fiber 56 and dispersion enhancement fiber 52. However, because the fifty kilometer transport fiber uses significantly less power than the expected one hundred kilometer fiber, the insertion losses caused by dispersion enhancement module 16 are tolerable and should not adversely impact the power budget. Thus, as illustrated by these examples, the use of dispersion enhancement module 16 provides favorable insertion loss characteristics while effectively handling dispersion caused by varying lengths of transport fiber.

However, while the embodiment illustrated and the preceding description focus on a particular embodiment of selectable enhancement module 34 that includes specific elements, system 10 contemplates dispersion enhancement module 16 using any suitable combination and arrangement of elements for applying selectable amounts of dispersion on optical signals.

FIG. 4 is a flowchart illustrating a method for configuring dispersion enhancement module 16 to provide a selected amount of dispersion enhancement for received optical signals. Dispersion enhancement module initially determines negative dispersion provided by dispersion compensation module 18 at step 80 and determines positive dispersion of the transport fiber at step 82. For example, controller 30 of dispersion enhancement module 16 may access values configured within memory 32. According to other embodiments, dispersion enhancement module 16 may receive configurations from an administrator and/or may determine these values, for example, by monitoring received optical signals or generating and monitoring test optical signals.

At steps 84 through 92, dispersion enhancement module 16 determines the appropriate amount of dispersion enhancement to effect upon received optical signals. Dispersion enhancement module 16 sets total positive dispersion equal to the positive dispersion of the transport fiber at step 84. The total positive dispersion represents a value used to track the amount of dispersion in optical signals delivered to dispersion compensation module 18. Thus, if all dispersion enhancement fibers within dispersion enhancement module 16 are bypassed, the total positive dispersion is equal to the amount of dispersion within fiber 14. Dispersion enhancement module 16 determines whether the difference in total positive dispersion and the negative dispersion of dispersion compensation module 18 is greater than or equal to the minimum dispersion enhancement at step 86. This determines whether the difference in positive and negative dispersions is significant with respect to the granularity of values available within dispersion enhancement module 16. For example, given the embodiments illustrated above, dispersion enhancement module 16 may only accommodate dispersion caused by increments of ten kilometers of transport fiber.

If the difference in positive and negative dispersions is sufficiently significant, dispersion enhancement module 16 determines the maximum available dispersion enhancement amount less than or equal to the difference at step 88. For example, using the exemplary values from the illustrated embodiments and assuming a transport fiber length of fifty kilometers when one hundred kilometers are expected, the maximum available dispersion enhancement amount less than or equal to the difference will result in the selection of dispersion enhancement fiber 56, which provides dispersion equivalent to forty kilometers of transport fiber. Dispersion enhancement module 16 enables the determined dispersion enhancement amount at step 90 and adds the determined dispersion enhancement amount to the total positive dispersion at step 92. Thus, for example, the total positive dispersion would now reflect dispersion resulting from ninety kilometers of transport fiber. Using the updated value for total positive dispersion, dispersion enhancement module 16 once again determines the difference in total positive dispersion and negative dispersion and whether additional dispersion enhancement is appropriate. Given the current example, dispersion enhancement module 16 will identify and enable dispersion enhancement fiber 52, thus substantially equaling the amount of dispersion provided within dispersion enhancement module 16 and the transport fiber to the expected transport fiber length.

After enabling appropriate amounts of dispersion enhancement, dispersion enhancement module 16 monitors the transport fiber at step 94 and determines whether the transport fiber has altered at step 96. For example, controller 30 may monitor to determine whether a switchover between various available transport fibers has occurred. If the transport fiber has altered, dispersion enhancement module 16 may reconfigure the amount of dispersion enhancement provided using a process similar to that discussed above. Thus, dispersion enhancement module 16 may automatically reconfigure in response to changed conditions.

However, the preceding flowchart illustrates only an exemplary method of operation, and system 10 contemplates dispersion compensation systems using any suitable techniques and elements for enhancing dispersion in received optical signals to a level expected by dispersion compensation equipment. Thus, many of the steps in this flowchart may take place simultaneously and/or in different orders than as shown. Moreover, systems may use methods with additional steps, fewer steps, and/or different steps, so long as the methods remain appropriate.

Although the present invention has been described in several embodiments, a myriad of changes and modifications may be suggested to one skilled in the art, and it is intended that the present invention encompass such changes and modifications as fall within the scope of the present appended claims. Moreover, to aid the Patent Office and any other readers in interpretation of the claims within any patent issued on this application, applicants wish to note that they do not intend by any statement in this specification to limit their invention in any way that is not otherwise reflected in the claims.

What is claimed is:

1. A dispersion compensation system comprising:
a dispersion compensation module (DCM) operable to receive optical input and provide optical output having a negative dispersion relative to the optical input, wherein the DCM comprises a plurality of dispersion compensation fibers having a negative dispersion; a dispersion enhancement module (DEM)
adapted to be optically coupled between the DCM and an optical fiber having a positive dispersion, the DEM operably including a plurality of dispersion enhancement fibers and operable to selectively increase the positive dispersion provided by the optical fiber by a selected one of a plurality of amounts and to provide the optical input to the DCM, the optical input having a positive dispersion substantially equal to the positive dispersion of the optical fiber plus the selected one of the amounts of dispersion in the DEM; and wherein the DEM comprises: a memory storing a value of the negative dispersion of the DCM; and a controller operable to determine the negative dispersion of the DCM to determine the positive dispersion of the optical fiber, and to determine the selected one of the amounts of dispersion in the DEM to provide the optical input having a positive dispersion substantially equal to an inverse of the negative dispersion of the DCM, the controller further operable to detect a switch from the optical fiber to a backup optical transport fiber, the backup transport fiber having a third positive dispersion, and to reconfigure the dispersion enhancement module to provide a fourth positive dispersion, the sum of the third positive dispersion and the fourth positive dispersion substantially equal to the magnitude of the negative dispersion.

2. The dispersion compensation system of claim 1, wherein a magnitude of the positive dispersion of the optical input is substantially equal to a magnitude of the negative dispersion of the DCM, such that the optical output has a dispersion near to zero.

3. The dispersion compensation system of claim 1, wherein the DCM compensates for dispersion along a fixed length of an optical fiber type, the optical fiber type having a positive dispersion per unit length; and wherein, if the optical fiber coupled to the DEM has an actual length less than the fixed length, the selected amount of dispersion in the DEM increases dispersion by an amount substantially equal to dispersion resulting from a length of the optical fiber type equal to the difference of the fixed length and the actual length.

4. The dispersion compensation system of claim 1, wherein the DCM is disposed between a first optical amplifier and a second optical amplifier, the first optical amplifier optically coupled to the DEM and operable to receive the optical input from the DEM, to optically amplify the optical input, and to provide the amplified optical input to the DCM.

5. The dispersion compensation system of claim 1, wherein the DCM comprises dispersion compensation fiber having a defined negative dispersion per unit length.

6. The dispersion compensation system of claim 1, wherein each of the plurality of dispersion enhancement fibers further comprises a defined positive dispersion per unit length, each of the dispersion enhancement fibers having a different length.

7. The dispersion compensation system of claim 1, wherein the DEM is operable to selectively couple one or more of the dispersion enhancement fibers together to form an optical path coupling the optical fiber to the DCM through the selected one or more of the dispersion enhancement fibers.

8. A method for dispersion compensation comprising:
providing an optical transport fiber coupling a first network element and a second network element,
the transport fiber having a first positive dispersion, the second network element having a negative dispersion;
providing a dispersion enhancement module disposed between the transport fiber and the second network element, the dispersion enhancement module comprising a memory storing a value of the negative dispersion of the second network element; determining a negative dispersion configuring the dispersion enhancement module to provide a second positive dispersion, the sum of the first positive dispersion and the second positive dispersion substantially equal to the magnitude of the negative dispersion, whereby configuring the dispersion enhancement module comprises routing optical signals from the transport fiber though one or more dispersion enhancement fibers;
detecting a switch from the transport fiber to a backup optical transport fiber, the backup transport fiber having a third positive dispersion; and
reconfiguring the dispersion enhancement module to provide a fourth positive dispersion, the sum of the third positive dispersion and the fourth positive dispersion substantially equal to the magnitude of the negative dispersion.

9. The method claim 8, wherein the negative dispersion in the second network element results from dispersion compensation fiber having a defined negative dispersion per unit length.

10. A dispersion compensation system comprising:
a first optical amplifier;
a second optical amplifier;
a dispersion compensation fiber optically coupled between the first optical amplifier and the second optical amplifier, the dispersion compensation fiber operable to receive optical input from the first optical amplifier and provide optical output to the second optical amplifier, the optical output having
a negative dispersion relative to the optical input, the dispersion compensation fiber having a negative dispersion; a dispersion enhancement module (DEM) adapted to be optically coupled between the first optical amplifier and an optical fiber having a positive dispersion, the DEM operably including a plurality of dispersion enhancement fibers and operable to selectively increase the positive dispersion provided by the optical fiber by a selected one of a plurality of amounts and to provide the optical input to the first optical amplifier, the optical input having a positive dispersion substantially equal to the positive dispersion of the optical fiber plus the selected
one of the amounts of dispersion in the DEM; and wherein the DEM comprises: a memory storing a value of the negative dispersion of the dispersion compensation fiber, and a controller operable to determine the negative dispersion of the dispersion compensation fiber, to determine the positive dispersion of the optical fiber, and to determine the selected one of the amounts of dispersion in the DEM to provide the optical input having a positive dispersion substantially equal to the positive dispersion of the optical fiber plus the selected one of the amounts of dispersion in the DEM, the controller further operable to detect a switch from the optical fiber to a backup optical transport fiber, the backup transport fiber having a third positive dispersion, and to reconfigure the dispersion enhancement module to provide a fourth positive dispersion, the sum of the third positive dispersion and the fourth positive dispersion substantially equal to the magnitude of the negative dispersion.

11. The dispersion compensation system of claim 10, wherein each of the plurality of dispersion enhancement fibers further comprises a defined positive dispersion per unit length, each of the dispersion enhancement fibers having a different length.

12. The dispersion compensation system of claim 10, wherein the DEM is operable to selectively couple one or more of the dispersion enhancement fibers together to form an optical path coupling the optical fiber to the DCM through the selected one or more of the dispersion enhancement fibers.

13. A dispersion enhancement module adapted to be optically coupled to a dispersion compensation module having a fixed negative dispersion, the dispersion enhancement module comprising:
an optical input adapted to couple to an optical transport fiber;
an optical output adapted to couple to the dispersion compensation module;
a plurality of dispersion enhancement fibers;
a plurality of optical switches coupling the optical input and the dispersion enhancement fibers, the optical switches operable to form an optical path between the optical input and the optical output, the optical path passing through one or more of the dispersion enhancement fibers, wherein optical signals from the optical output have a positive dispersion substantially equal to a sum of positive dispersion of the transport fiber and
positive dispersion of the optical path; a memory storing a value of the fixed negative dispersion of the dispersion compensation module; and a controller operable to determine the fixed negative dispersion of the dispersion compensation module, to determine the positive dispersion of the transport fiber, to determine the optical path, and to configure the optical switches to establish the optical path, the controller further operable to detect a switch from the transport fiber to a backup optical transport fiber, to determine a second optical path between the optical input and the optical output, the second optical path passing through one or more of the dispersion enhancement fibers, and to reconfigure the optical switches to establish the second optical path.

14. The dispersion enhancement module of claim 13, wherein a magnitude of the positive dispersion of the optical signals is substantially equal to a magnitude of the negative dispersion of the dispersion compensation module.

15. The dispersion enhancement module of claim 13, further comprising a controller operable to:
detect a switch from the optical transport fiber to a backup optical transport fiber;
determine a difference in magnitudes of the negative dispersion of the dispersion compensation module and a positive dispersion of the backup optical transport fiber; and
reconfigure the optical switches such that the optical path has a positive dispersion equal to the difference in the magnitudes.

16. The dispersion enhancement module of claim 13, further comprising a controller operable to:
determine the negative dispersion of the dispersion compensation module;
determine the positive dispersion of the optical transport fiber; and
configure the switches such that a magnitude of the positive dispersion of the optical signals from the optical output is substantially equal to a magnitude of the negative dispersion of the dispersion compensation module.

17. The dispersion enhancement module of claim 13, wherein the switches are further operable to optically couple the optical input and the optical output such that the optical path bypasses the dispersion enhancement fibers.

* * * * *

UNITED STATES PATENT AND TRADEMARK OFFICE
CERTIFICATE OF CORRECTION

PATENT NO. : 7,577,366 B2  Page 1 of 1
APPLICATION NO. : 10/041853
DATED : August 18, 2009
INVENTOR(S) : David G. Way It is certified that error appears in the above-identified patent and that said Letters Patent is hereby corrected as shown below:

Col. 4, Ln. 45: After "module" delete "31" and insert -- 34 --;

Col. 9, Ln. 66: After "negative dispersion" insert -- of the second network element; --.

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,577,366 B2
APPLICATION NO. : 10/041853
DATED : August 18, 2009
INVENTOR(S) : David G. Way Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1128 days.

Signed and Sealed this

Seventh Day of September, 2010

David J. Kappos
*Director of the United States Patent and Trademark Office*